United States Patent

[11] 3,556,288

[72] Inventor Helmuth Assauer
 Wuppertal-Elberfeld, Germany
[21] Appl. No. 819,191
[22] Filed Apr. 25, 1969
[45] Patented Jan. 19, 1971
[73] Assignee Firma Kohler & Bovenkamp G.m.b.H.
 Wuppertal-Barmen, Germany
[32] Priority Aug. 29, 1968
[33] Germany
[31] No. K62216

[54] CHIP CONVEYOR
 8 Claims, 4 Drawing Figs.
[52] U.S. Cl. ................................................ 198/224,
 198/173
[51] Int. Cl. .................................................. B65g 25/08
[50] Field of Search........................................... 198/221,
 224, 94, 109, 181, 182, 189; 74/(Inquired);
 104/134, 176

[56] References Cited
 UNITED STATES PATENTS
 1,959,085 5/1934 Preble ........................... 198/189
 2,925,169 2/1960 Garand et al. ................ 198/224

Primary Examiner—Evon C. Blunk
Assistant Examiner—Alfred N. Goodman
Attorney—Woodhams, Blanchard and Flynn

ABSTRACT: A chip conveyor comprising a plurality of guide blocks slideably mounted for back and forth movement on a rail fixedly positioned on and extending longitudinally of the bottom wall of a trough-shaped conveyor housing. The guide blocks are hingedly connected to one another and carry pushing blades which extend into and occupy a portion of the trough cross section. The upper sides of the guide block are provided with vertically extending hinge pins which support plate-shaped side bars interconnecting the guide blocks to one another for permitting the conveyor to extend through a horizontally curved portion of the conveyor housing. The guide blocks are slideably mounted on a curved rail portion which extends throughout the curved housing portion. The pushing blades are mounted, preferably pivotably, on the side bars.

INVENTOR.
HELMUTH ASSAUER

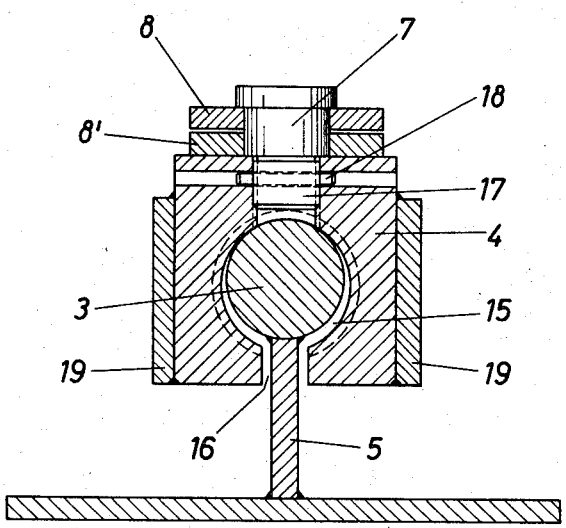
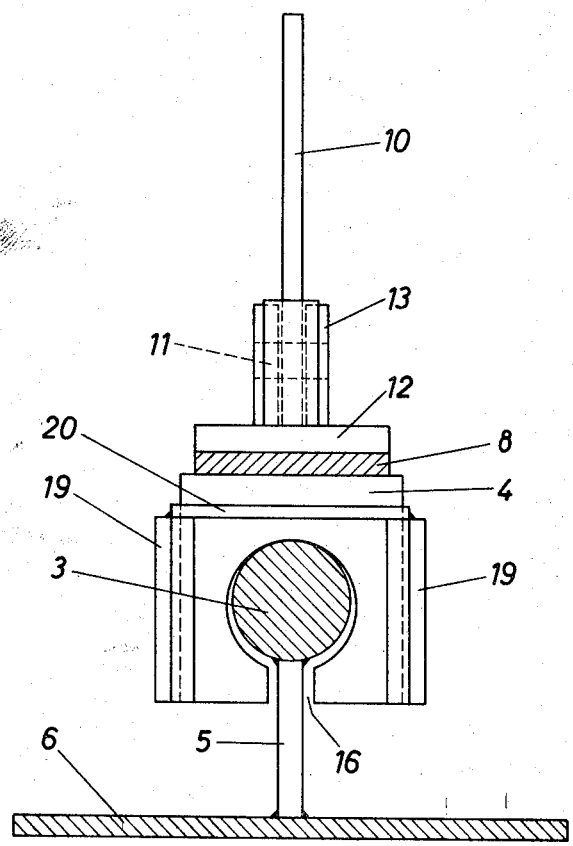

CHIP CONVEYOR

The invention relates to a chip conveyor comprising guide blocks moving back and forth on the bottom of the conveyor trough, sliding on stationary rails on the trough bottom and being hingedly connected to one another, which guide blocks carry pushing blades which occupy only a part of the trough cross section.

Chip conveyor units generally used have only straight line, horizontally extending conveyor troughs and have back and forth movable pushing blades which are mounted to straight rods which are movably supported by means of guide blocks and which are rigidly connected.

However, it is further known to construct curved conveyor trough sections in a vertical plane in order to convert a horizontally extending trough into an inclined trough. Hingedly connected rail-guided members are thereby constructed in the arc-shaped part, which members carry pushing blades.

In practice, it is often desired to construct in a horizontal plane conveyor trough sections which depart angularly from a straight line condition. For this purpose, the conveyor troughs have in the past been arranged in intersecting relationship and an overload handling point has been provided. This, however, results in various structural and operational difficulties with respect to the drive and the synchronism.

In comparison to this, the basic purpose of the invention is to construct a chip conveyor, in particular for metal drillings, which provides a curve in a horizontal plane without operational difficulties.

For this purpose, according to the invention, there are provided guide blocks which have hinge pins on the upper side positioned in a vertical direction and which support preferably plate-shaped side bars to connect the guide blocks with one another on which side bars there are arranged the pushing blades.

Furthermore each side bar is according to the invention offset in a steplike manner in its center portion and each lowermost positioned side bar rests on the upper side of the guide blocks.

According to the invention, the support blocks for the pushing blades are arranged on the lower positioned step of the side bar.

Further, according to the invention rearwardly directed, freely projecting lateral protective plates can be provided on the side surface of the guide blocks.

Said lateral protective plates are according to the invention connected fixedly at their one ends by a bridge which is positioned underneath the side bar. The protective plates can converge toward their other, or free, ends.

Furthermore, the side bars permit the use of pivotable pushing blades, whose movement is limited by stops, and also permit the protecting of bearings against chips.

According to the above construction, there is obtained an operationally favorable flexibility of the guide blocks so that any desired horizontal curve guide of the chip conveyor is possible. A simple sturdy structural form is achieved. The steplike offsetting of the side bars results in a high resistivity and a favorable mounting of the pushing blades. Furthermore, the slide guiding of the guide blocks is protected by the lateral protective plates against the clamping of chips.

The invention is illustrated in an embodiment chosen for illustrative purposes only in the drawings in which:

FIG. 3 is a cross section along the line 3–3 of FIG. 2,

FIG. 4 is a cross section along the line 4–4 of FIG. 2.

The chip conveyor consists essentially of the conveyor trough 1 having preferably a synclinal cross section, a stationary rail 3 being mounted to the bottom 2 thereof which bottom forms the trough base, and guide blocks 4 which are hingedly connected to one another and which slide on said rail 3.

Figure 2:
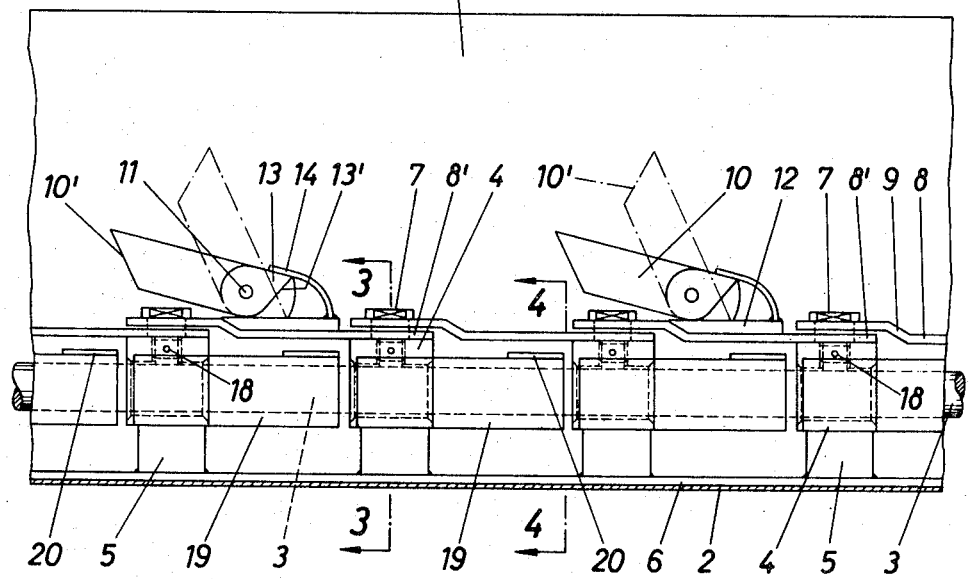
FIG. 2 is a longitudinal cross section of FIG. 1.

The rail 3 consists of a rod which has a circular cross section and which is inclined corresponding to the trough 1 which extends arc-shaped in a horizontal plane. The rod which forms said rail 3 is, as this is illustrated in FIG. 2, supported at short intervals by posts 5 which are placed on the base plate 6 of the rail.

To hingedly connect the guide blocks 4, vertically standing hinge pins 7 are provided on the upper side of said guide blocks, which hinge pins 7 advantageously penetrate through plate-shaped side bars 8. The side bars 8 which are connected to form a continuous row rest with their ends one on top of the other in a hingelike manner.

Each side bar 8 is offset in a steplike manner at its center portion 9. The end of the side bar 8' which is arranged as the lowermost one is supported on the upper side of the respective guide block 4 (FIG. 4).

The side bars 8 are used as carriers for the pushing blades 10. Said pushing blades 10 are constructed pivotably about the hinge pin 11 of a bearing block 12 which is welded to the side bar 8 and which is positioned on the lower step. The blades 10 are constructed with points 10' which point in the feed or forward direction; they are provided with stop edges 13, 13' at the rearward ends, which stop edges, when in the pivoted-in position of the blade, abut a protective plate 14 and, when in the pivoted-out position of the blade, abut the base plate of the block 12 and define the limit positions. Moreover, the protective plate 14 prevents the clogging of the bearing gap in the block.

The guide blocks 4 consist of a cubical member which is provided with a bore 15 which is approximately parallel to its upper surface. The diameter of said bore 15 is slightly larger than the diameter of the rail 3. The bore 15 is opened through a slot 16.

The hinge pin 7 is inserted with its threaded shaft end 17 into a corresponding hole which is provided on the upper side of the motor perpendicular to the axis of the bore 15. A holding pin 18 which transversely penetrates through the guide block 4 is used as a lock for the hinge pin 7.

Rearwardly directed, freely projecting lateral guide blocks which reach to the adjacent guide blocks are provided on the side surface of the guide block 4 opposite the conveyor direction. The protective plates 19 converge so that a smooth outer surface of the back and forth moving chip conveyor is formed along the curve during the return stroke. The protective plates 19 of each guide block 4 are connected with their ends through a bridge 20 which is positioned underneath the side bar 8 in order to obtain a stability of the protective plates.

Figure 1:
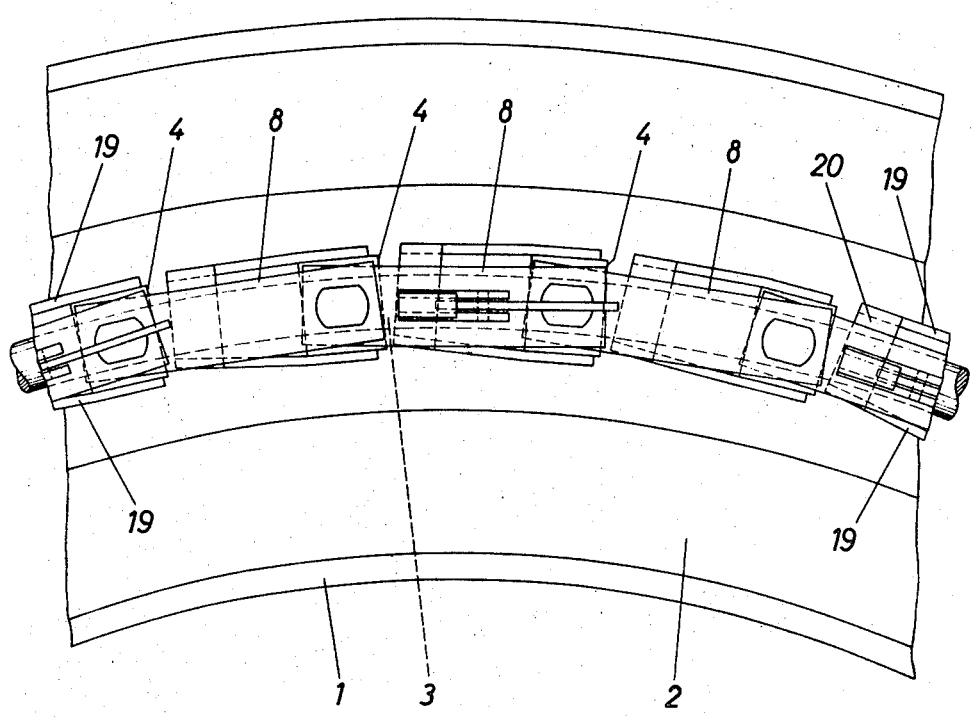
FIG. 1 is a top view of a section of the chip conveyor of the invention.

Of course the curve illustrated in FIG. 1 can also extend inclined in the opposite direction. The required inclination radius can also be easily obtained for very strong curves due to the short side bars.

I claim:

1. A chip conveyor comprising guide blocks moving back and forth on the bottom of a conveyor trough and sliding on a stationary rail on the trough bottom and being hingedly connected to one another, said guide blocks carrying pushing blades which take up only a part of the trough cross section, the guide blocks having on the upper side hinge pins positioned in a vertical direction, which hinge pins support plate-shaped side bars which connect the guide blocks to one another, the pushing blades being arranged on said side bars.

2. A chip conveyor according to claim 1, wherein each side bar is offset in a steplike manner in its center portion and each lowermost side bar rests on the upper side of the guide blocks.

3. A chip conveyor according to claim 1, wherein the support blocks for the pushing blades are arranged on the lower positioned step.

4. A chip conveyor according to claim 1, wherein rearwardly directed, freely projecting lateral protective plates are provided on the side surfaces of the guide blocks.

5. A chip conveyor according to claim 4, wherein the side surfaces of the protective plates are connected fixedly at the ends by a bridge positioned underneath the side bar.

6. A chip conveyor according to claim 4, wherein the protective plates converge toward their free end.

7. A chip conveyor according to claim 1, wherein the pushing blades are pivotable limited by stops and their rearward end is covered by a protective cover forming the one stop.

8. A conveyor for moving material in a forward direction from a first to a second position, comprising:
- a trough-shaped conveyor housing extending between said first and second positions, said conveyor housing including a horizontally curved portion;
- a guide rail positioned within said housing and fixedly secured to the bottom wall thereof, said guide rail extending longitudinally of said housing between said first and second positions and including a curved rail portion extending throughout said curved housing portion;
- conveyor means slideably mounted on said rail for back and forth movement and extending between said first and second positions, said conveyor means including a plurality of guide blocks slideably mounted on said curved rail portion and means pivotally interconnecting the adjacent guide blocks, said means including vertically extending pin means mounted on each of said guide blocks and link means extending between and interconnected to the pin means of adjacent guide blocks for pivotally interconnecting same;
- said conveyor means further trough a plurality of axially spaced pushing blades with said pushing blades being pivotal between a first portion wherein the blades lie closely adjacent the rail and extend in said forward direction and a second position wherein the blades extend outwardly relative to the rail so as to extend into the centraL portion of the trough cross section; and
- said conveyor means including stop means for limiting the pivotal movement of said blades between said first and second positions and mounting means for pivotally mounting said pushing blades on the upper surface of said connecting link means whereby said pushing blades are positioned directly above said rail for pivotal movement within a substantially vertical plane.